July 26, 1955 R. O. SHIDELER 2,713,881
METHOD FOR REMOVING THE SHELL OF A HARD BOILED EGG
Filed March 20, 1953
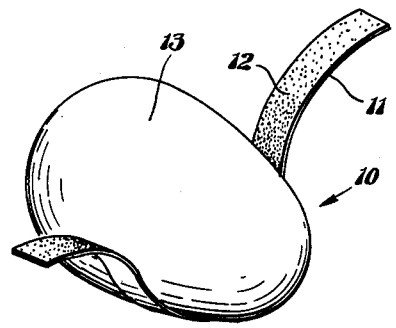
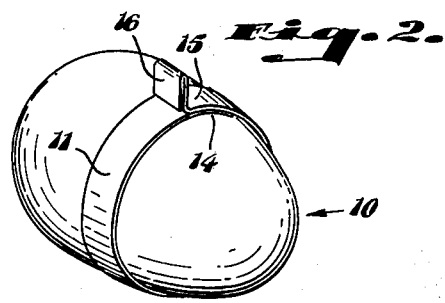
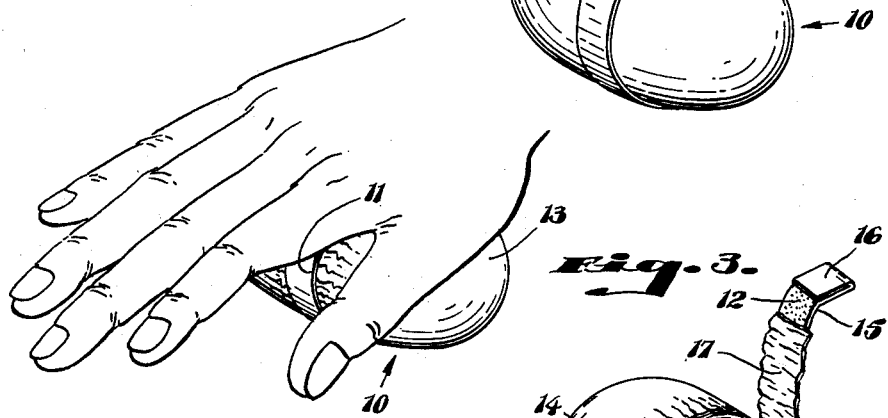
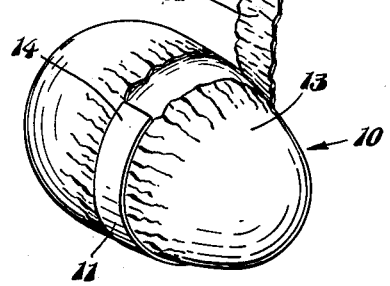
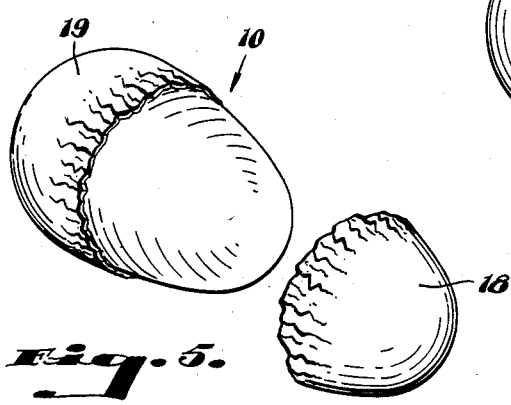
INVENTOR.
ROSS ODOR SHIDELER,
BY:
Harold B. Hood.
ATTORNEY.

United States Patent Office 2,713,881
Patented July 26, 1955

2,713,881

METHOD FOR REMOVING THE SHELL OF A HARD BOILED EGG

Ross Odor Shideler, Indianapolis, Ind., assignor to United States Equipment Corporation, Indianapolis, Ind., a corporation of Indiana Application March 20, 1953, Serial No. 343,756

1 Claim. (Cl. 146—221)

The present invention relates to a method and a means for removing the shell from a hard-boiled egg.

Certain types of eating establishments offer hard-boiled eggs to their customers in an unshelled condition. The customer is then obliged to crack and remove the shell himself, this operation being not only messy, but the necessity for such materially detracting from the sales appeal of this product.

It is the primary object of this invention is to provide a method and a means for greatly facilitating the removal of the shell from such an egg, thereby presenting a more attractive product to the consumer.

A further object of the invention is to povide, as an article of manufacture, a hard-boiled egg with means attached thereto whereby the consumer can quickly and easily remove the shell from the egg.

Further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

Fig. 1 is a perspective view of an egg showing the manner in which my shelling means is attached thereto;

Fig. 2 is a perspective view of an egg showing the shelling means in place on the egg;

Fig. 3 is a pictorial view showing one manner of breaking the shell prior to removing the same;

Fig. 4 is a perspective view of the egg showing a portion of the shell being removed therefrom by the use of my invention; and Fig. 5 is a perspective view showing the manner in which the remaining portions of the shell can be removed from the egg.

Referring more particularly to the drawings, I have illustrated an egg 10 which has been hard-boiled prior to the commencement of the shelling process as illustrated. About the mid-portion of the egg 10 I wrap a length of tape 11. This tape is provided on one side with an adhesive coating 12 engageable with the shell 13, and is of a length at least sufficient to encircle the egg and preferably, as seen in Fig. 2, to provide overlapping end portions 14 and 15. In order to fulfill the object of this invention, it is necessary that the adhesive material of coating 12 be of such character that the adhesion between the tape 11 and the eggshell 13 be greater than the adhesion between the putamen membrane and the solidified albumen, a fact which will later become apparent. For convenience of application, it is also desirable, but not essential, that this material be of the pressure-adhesive type.

To facilitate the removal of tape 11 from about the egg, I prefer to provide a tab 16 on one end of the tape. This tab may take any desirable form but I presently prefer to form it by folding a short section of the tape 11 back on itself to bring the adhesive surface of that portion into cohesion with the adhesive coating on the main body of the tape, as clearly shown in Fig. 2.

The egg at it appears in Fig. 2 is now ready for delivery to the consumer. To remove the shell, it must first be cracked throughout the region of tape 11. This can be done by striking the egg with some type of instrument, such as a knife or the like, while holding the egg in one's hand, but I have found that this breaking is most easily accomplished by rolling the egg substantially about the major axis of the egg while applying a crushing force to the egg with the hand as shown in Fig. 3. The only requirement is, however, that the shell be thoroughly shattered completely around the egg beneath the tape 11.

Now, by grasping tab 16 and pulling firmly thereon, that portion 17 of the shell to which the tape 11 adheres will be stripped from about the egg, as clearly shown in Fig. 4, dividing the egg into two separate end portions 18 and 19 (Fig. 5). Thereafter, these portions can be easily slipped from the ends of the egg.

The use of my invention not only provides a quick and convenient method for removing the shell from a hard-boiled egg, but its use materially increases the sales appeal of this product, and, because of the simplicity of the device, without any increase in cost of the product to the ultimate consumer.

I claim as my invention:

A method for removing the shell from a hard-boiled egg comprising the steps of providing an adhesively-joined shell region extending annularly about the mid-portion of the egg, thereafter cracking the shell throughout said region, stripping said shell region from about the egg thereby to divide the shell into two separate end portions, and thereafter slipping said end portions from said egg.

References Cited in the file of this patent

UNITED STATES PATENTS

| | | |
|---|---|---|
| 2,452,174 | Arnold | Oct. 26, 1948 |
| 2,506,073 | Duzmal | May 2, 1950 |
| 2,592,969 | Stachowiak | Apr. 15, 1952 |
| 2,660,530 | Adams | Nov. 24, 1953 |